(12) United States Patent
Alger et al.

(10) Patent No.: US 10,469,399 B2
(45) Date of Patent: Nov. 5, 2019

(54) MANAGING REMOTE DEVICE BASED ON PHYSICAL STATE OF A MANAGEMENT DEVICE

(71) Applicant: International Business Machines Corporation, Armonk, NY (US)

(72) Inventors: Joshua A. Alger, Raleigh, NC (US); Alan R. Buss, Raleigh, NC (US); Jeffrey R. Hoy, Gibsonia, PA (US); Belinda M. Vennam, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 14/983,042

(22) Filed: Dec. 29, 2015

(65) Prior Publication Data

US 2017/0187643 A1      Jun. 29, 2017

(51) Int. Cl.
*H04L 12/911* (2013.01)
*H04L 29/08* (2006.01)
*H04L 12/26* (2006.01)

(52) U.S. Cl.
CPC .......... *H04L 47/70* (2013.01); *H04L 43/0805* (2013.01); *H04L 67/10* (2013.01)

(58) Field of Classification Search
CPC ..... H04L 47/70; H04L 43/0805; H04L 67/10; G06F 9/45558; G06F 2009/4557; G06F 2009/45583; G06F 11/1458; G06F 3/0611; G06F 3/0653
USPC ....................................................... 709/226
See application file for complete search history.

(56) References Cited

U.S. PATENT DOCUMENTS

| | | | |
|---|---|---|---|
| 8,291,425 B2 | 10/2012 | Takashige et al. | 718/104 |
| 8,812,629 B2 | 8/2014 | Arling et al. | 709/220 |
| 8,832,345 B2 | 9/2014 | Iverson et al. | 710/303 |
| 8,907,981 B2 | 12/2014 | Betzler et al. | G06F 9/4411 |
| 2007/0204166 A1 | 8/2007 | Tome et al. | 713/182 |
| 2007/0255920 A1* | 11/2007 | Gold | G06F 3/0611 711/170 |
| 2008/0147375 A1* | 6/2008 | Siren | G06F 3/0605 703/24 |
| 2010/0083015 A1* | 4/2010 | Yokota | G06F 1/3209 713/310 |

(Continued)

OTHER PUBLICATIONS

Rahul Sharma and Dr. Amod Tiwari, Mobile Cloud Computing: Analysis, Inclination and Perspectives, International Journal of Innovations in Computing (ISSN : 2319-8257) vol. 2 Issue 1, pp. 1-10.

(Continued)

*Primary Examiner* — Davoud A Zand
*Assistant Examiner* — Kristoffer L S Sayoc

(57) ABSTRACT

Cloud security may be provided remotely via a device with network capabilities. Virtual resources managed by the cloud configuration may also be modified and updated based on status changes to the device that may be managed by an administrator. One example may include at least one of associating a virtual resource with a physical device, configuring the virtual resource based on an initial state of the physical device, detecting a change in the initial state of the physical device to a different state of the physical device, and updating the virtual resource based on the different state of the physical device.

23 Claims, 10 Drawing Sheets

(56) References Cited

U.S. PATENT DOCUMENTS

| | | | |
|---|---|---|---|
| 2011/0173082 A1 | 7/2011 | Breitenbach et al. | .......... 705/16 |
| 2014/0108558 A1* | 4/2014 | Borzycki | ............ G06F 21/6218 |
| | | | 709/205 |
| 2016/0095044 A1* | 3/2016 | Maria | ................. H04L 12/4641 |
| | | | 370/329 |

OTHER PUBLICATIONS

Disclosed Anonymously, Smart Device Cloud, An IP.com Prior Art Database Technical Disclosure, pp. 1-14, IP.com No. IPCOM000206936D.

* cited by examiner

180

MANAGING REMOTE DEVICE BASED ON PHYSICAL STATE OF A MANAGEMENT DEVICE

TECHNICAL FIELD

This application relates to cloud resource management and security and more particularly to associating virtual resources with a physical device state.

BACKGROUND

In earlier network systems, when machines and networks were entirely physical, a system administrator could visually inspect an environment to map connectivity and other network environment conditions. If an administrator wanted to disconnect a machine from a network, the machine was simply unplugged, and if connectivity needed to be mapped, a cable could be followed to its source or destination.

In a virtual environment there is no capability to physically disconnect a machine. Network switches and software-defined networks can be reconfigured to provide a virtual disconnection, however user error/misconfiguration can easily create an unintended configuration. Flaws in software and security vulnerabilities in the configuration can also potentially leave the machine(s) connected or reconnected to the network.

An individual, such as a system administrator, has little tangible guarantee to know how networks and systems are connected in a virtual environment. The option to "cut the cord" and have a physical guarantee of network disconnect is a feature lost in virtual environments. In one example, a full disconnection of a machine can lower the vulnerability for attackers, or be taken as an extreme measure in response to an attack. Disabling of network connectivity could prevent a machine, such as a mobile device or traveling laptop from automatically connecting to potentially compromised networks. Also, manual inspection of network cables to validate physical paths and to match an intended architecture is another option. However, in a virtual environment, the options to manage machines remotely and efficiently may require additional security and administrative measures.

SUMMARY

One example method of operation may include a method that includes at least one of associating a virtual resource with a physical device, configuring the virtual resource based on an initial state of the physical device, detecting a change in the initial state of the physical device to a different state of the physical device, and updating the virtual resource based on the different state of the physical device.

Another example embodiment may include an apparatus that includes a processor configured to perform at least one of associate a virtual resource with a physical device, configure the virtual resource based on an initial state of the physical device, detect a change in the initial state of the physical device to a different state of the physical device, and a transmitter configured to update the virtual resource based on the different state of the physical device via a message.

Yet another example embodiment may include a non-transitory computer readable storage medium configured to store instructions that when executed causes a processor to perform at least one of associating a virtual resource with a physical device, configuring the virtual resource based on an initial state of the physical device, detecting a change in the initial state of the physical device to a different state of the physical device, and updating the virtual resource based on the different state of the physical device.

DETAILED DESCRIPTION

Figure 1A:
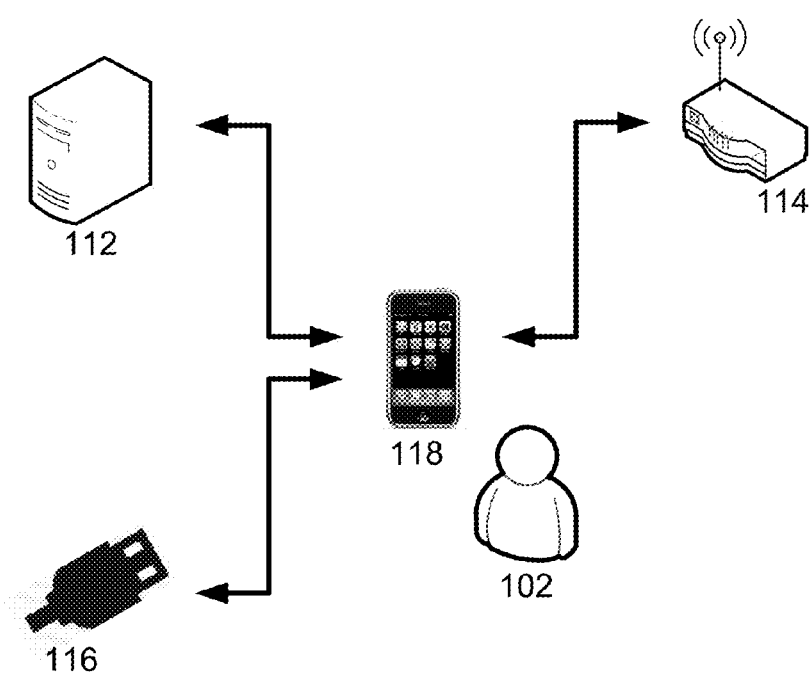
FIG. 1A illustrates an example network configuration of managing network resources according to example embodiments.

It will be readily understood that the instant components, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments.

The instant features, structures, or characteristics described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments, the application may be applied to many types of network data, such as, packet, frame, datagram, etc. The term "message" also includes packet, frame, datagram, and any equivalents thereof. Furthermore, while certain types of messages and signaling are depicted in exemplary embodiments they are not limited to a certain type of message, and are not limited to a certain type of signaling.

Example embodiments provide a configuration and method of associating a virtual resource with a physical device. One example may include configuring network connectivity of the virtual resource based on a physical state of the physical device, and when detecting a change of the physical state of the physical device, reconfiguring the network connectivity of the virtual resource. The associating of the virtual resource with the physical device may include various constraints, such as a time constraint, a location constraint, third party device constrains, etc. Also in this example, the physical device could be any of a network diagram, a router, a smartphone, and a device including a processor and memory.

According to example embodiments, high-level, physical objects, such as a network router and/or Ethernet cables could also represent virtual capabilities, such as a software-defined switch and network routes in a virtual environment. The hardware device or hardware element may be linked to one or more virtual devices or elements linked to a virtual environment. In operation, when a user plugs and unplugs an Ethernet cable into a switch it will trigger corresponding connection and disconnection of the physical device as well as a represented virtual resource that is specifically identified and which is responsive to the physical status of the physical device.

In a network setup configuration, a system operator may identify physical objects and devices, such as an enhanced Ethernet cable or smartphone to represent virtual resources, such as a virtual machine (VM) image or a network path. The physical elements may define the virtual elements via a virtual environment configuration. For example, the physical elements may be named and/or identified by a characteristic (i.e., wire, router, workstation, virtual machine, wireless device, server, virtual server, etc.). The administrative capabilities of the virtual resource are delegated to the physical device existence and operation. The interactions with the physical devices may trigger reconfigurations of the represented virtual configurations. For example, if a router and a workstation operating on the physical network communicate and establish a communication path, then the virtual environment may update accordingly to reflect a particular type of communication path as being established between two particular network elements.

Virtual scanning can be employed to validate that a reconfiguration has a desired result. The use of reverse avatars may provide system security by enabling the hardware device to be a reverse avatar and its configuration to be a way to enable/disable virtual resources. Delegation of virtual resources can control physical devices and the same in reverse. The virtual device may represent an avatar of the physical device. However, the physical device may represent a reverse avatar of the virtual device. The delegation of virtual resources may then be configured based on a time allotment, and configuration of virtual resources may be performed based on changes to the physical devices. Use of non-electronic devices may also be part of the representation and control of virtual resources. The use of enhanced representative devices may be performed to represent and control virtual resources. Also, the use of smart devices and their interactions can be used to represent and control virtual resources.

In one specific example, a user may want to control network connectivity of their home workstation using a physical reverse avatar. This example may include disconnecting the home workstation when it is not in use, or remotely disconnecting the machine when children in the house may be in the same room to prevent tampering with the workstation. In this case, the workstation may be physical and the network is likely wireless and is maintained via a WIFI connection from the workstation to a local router which provides Internet access and related services.

FIG. 1A illustrates an example network configuration 100 of managing network resources according to example embodiments. In this example, there is no actual cord that can be unplugged to remove connectivity to a workstation. As a result, user A 102, the owner or individual that can control the remote machine 112, delegates network administration capability of the remote machine 112 through a device, such as a smartphone 118, for example. The delegation can take place the through the operating system and/or through an application (not shown) operating on the workstation 112, the smartphone 118 and/or a network, such as the Internet (not shown), connecting these devices. User A 102 also delegates network connectivity for the machine to an object, such as a USB cable 116, for example, that can be attached to the smartphone. This attachment action triggers the USB interface on the smartphone to become enabled regardless of the lack of a peripheral device on the other end of the USB cable 116. However, this cable attachment action alone can trigger a change of state such as a disable/power-down/WIFI 'off' operation to occur from the smartphone application and remotely across the router 114 to the workstation 112. In this example, the reverse avatar 116 is a physical cable that triggered a virtual action to occur which resulted in a loss of communication at a remote workstation 112. In other words, an arbitrary physical connection is configured in the smartphone to represent physical connectivity of a particular device, such as the remote workstation.

In this example the smartphone 118 represents control of the workstation 112 and router 114, and the USB cable 116 represents the network link between the remote workstation 112 and the router 114. When the USB cable 116 is plugged-in it triggers the application on the smartphone 118 to activate connectivity between the remote workstation 112 and the router 114. When the USB cable 116 is disconnected it triggers the application to remove connectivity between the remote workstation 112 and the router 114. User A 102 then has a physical representation and guarantee of the connectivity of a virtual or remote device.

Figure 1B:
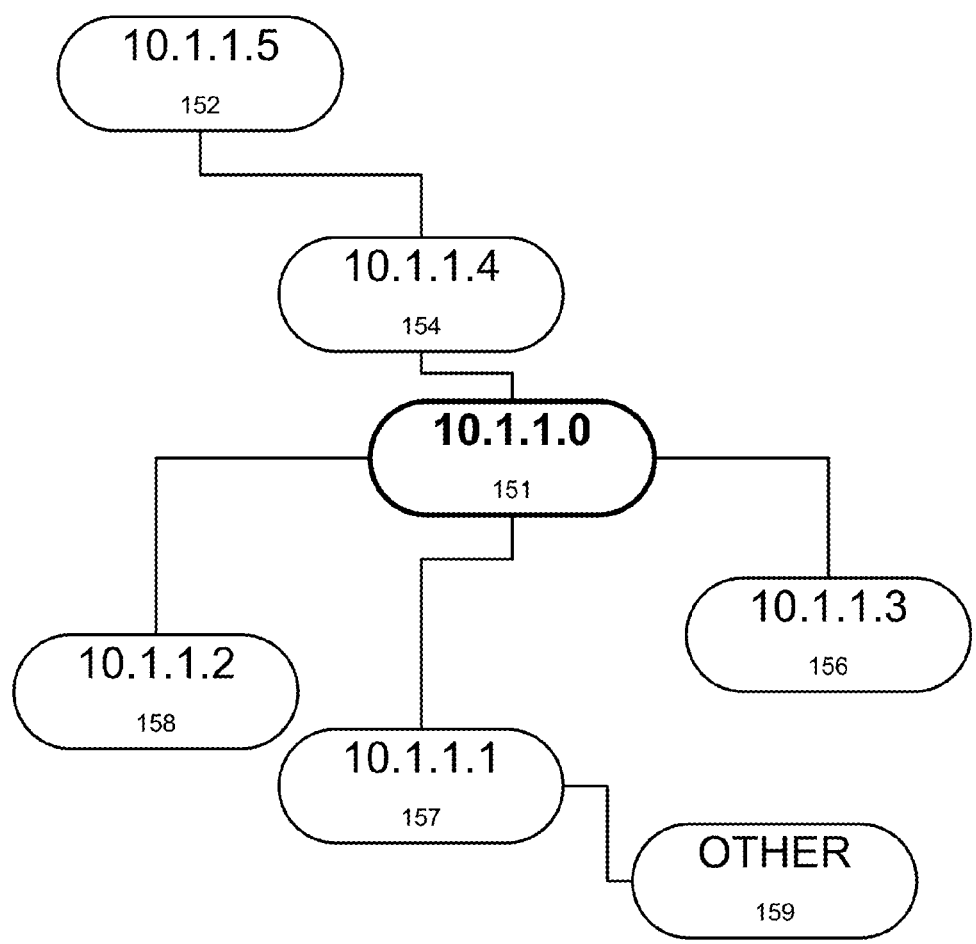
FIG. 1B illustrates an example administrative network setup configuration for managing network allocation according to example embodiments.

FIG. 1B illustrates an example administrative network setup configuration 150 for managing network allocation according to example embodiments. Referring to FIG. 1B, the IP address and network allocation example illustrates a series of IP addresses which would likely be drawn on a whiteboard or other surface that could identify the words, letters, numbers, associations (connectors), to setup a network allocation scheme. In this example, a network administrator may be responsible for network routing and management within a production-level cloud system. For security reasons, machine connectivity may be restricted between specific machines. To guarantee the configuration matches a desired setup configuration, the system administrator could delegate network administration to an electronic whiteboard in an office. In other embodiments, a network (not shown) that is communicably coupled to the electronic whiteboard can delegate network administration to the whiteboard. The configuration of machines, routes, and IP addresses 151-159, drawn on the whiteboard, are captured and sent to a translator that encodes the drawn picture into a network graph. The application then applies the network graph to configure the virtual network by assigning addresses to the respective devices on the network. The drawn configuration represents the reverse avatar that is used to create a virtual network IP address allocation.

In this scenario, the user would have a physical representation of the network. The network can be reconfigured by physically updating the diagram, and a guarantee of the network paths may be provided based on a physical reverse avatar. The control is delegated to the system based on the whiteboard configuration, the user will then have confidence that no other user can unintentionally misconfigure the network. The user would not want the whiteboard to be accidentally erased, so the system could take a snapshot of the whiteboard and only update the configuration when desired. With the delegation of the network control on an individual smartphone, multiple smart devices can be used to represent multiple machines operating on the network. The whiteboard can be translated via a sensory board or via a photograph which is translated to character recognition and which can be identified as actual numbers and/or other characters representative of a network configuration.

Figure 1C:
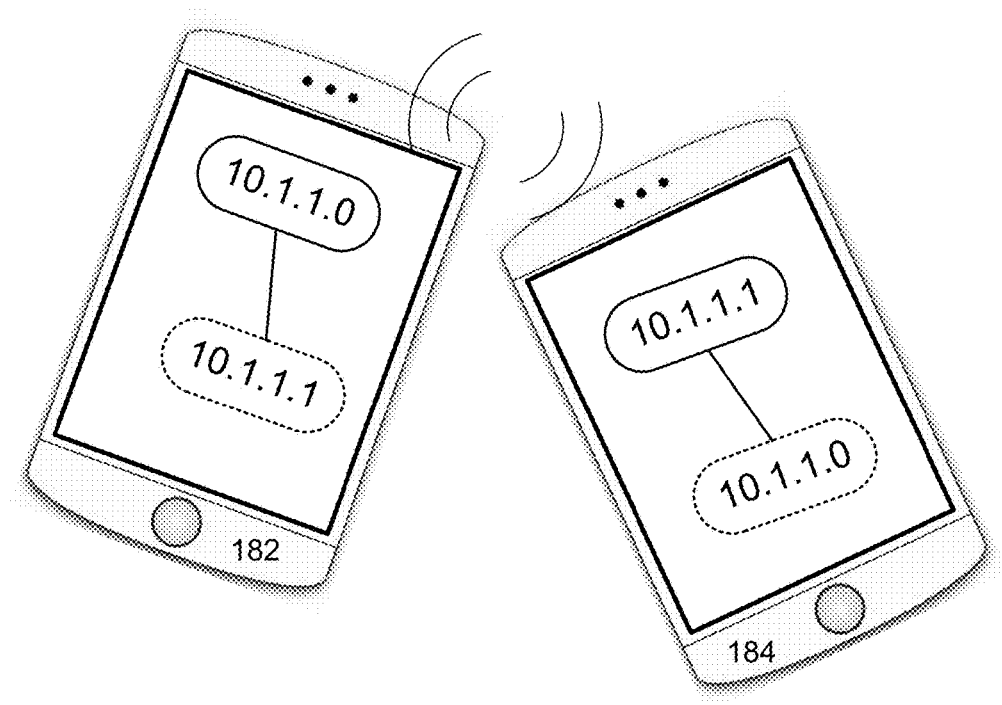
FIG. 1C illustrates an example network sharing configuration for managing network resources between physical devices according to example embodiments.

FIG. 1C illustrates an example network sharing configuration 180 for managing network resources according to example embodiments. In this example, interactions 180 between the smart devices 182 and 184 can be used to represent interactions in the virtual environment. For example, connecting a USB cable between two reverse avatar enabled smartphones 182/184 would represent a network link between the virtual machines and trigger a corresponding configuration or reconfiguration. In another example, various connections, such as near-field-communications (NFC), a smartphone "bump", or another physical or wireless connection, can be used to create a link between the represented devices as illustrated in FIG. 1C.

Additionally, the reverse avatar capabilities can be time-limited based on requirements. For example, creating a connection between two reverse avatars owned by two different people can by default persist for a certain amount of time (such as for 60 minutes) and no longer. This configuration may be helpful in situations where a certain number of machines need to communicate for a particular duration. Delegation of control to the reverse avatar could also be limited to time or other factors, for example to delegate control while an individual is traveling. In one embodiment, GPS locations can be used to create restraints and acceptance, as well, and in addition to the time constraint. For instance, as the user device approaches an enterprise environment and receives a connection, for example, via a NFC "bump" from an administrator on-site or at the gate of the building, a time limit and/or a location constraint may be imposed such that when the user device exits the building for any period of time the privileges are eliminated per the GPS signal indicating a deviation from the on-site premises. Also, a predefined period of time later (i.e., 8 hours later) the user device may also be removed from the virtual network and become inaccessible to the firewall.

Delegation of administration capability to a physical device and avatars reduces the likelihood of other sources of misconfiguration. However, software bugs and system attacks still have potential to reconfigure a network, such as a cloud environment in a way that does not match the physical representation desired. Use of cloud-based system and network scanners can be employed to additionally validate that a virtual configuration matches a physical configuration. For example, in the whiteboard scenario of setting up a network address allocation, a cloud-based environment scanner could be used to build a network diagram of the actual network connectivity in the virtual environment. If the scanned environment does not match the physical representation, an administrator, via a device that includes a processor and memory, can be alerted to a system failure.

Theft of a physical avatar could be a concern. In such a scenario, an attacker could simply steal the avatar rather than hacking a machine. Additional authentication and controls can be applied to the domain of the physical avatars to prevent use by other individuals or systems thus making the theft of the physical avatar insignificant. For example, the system could permit the avatar to be a valid representation only if it remains within a particular location, such as a room as identified via a constant wireless heartbeat configuration which constantly identifies the location of the reverse avatar as within a wireless communication range. Or, in another example, the system could require additional factors of authentication for a privileged user when reconfiguring the system. The system can also provide a reset capability for the owner of the represented system, for example, in case of loss or destruction of the physical avatar. The owner could simply log into the application and change the password and avatar to a new device.

Figure 2:
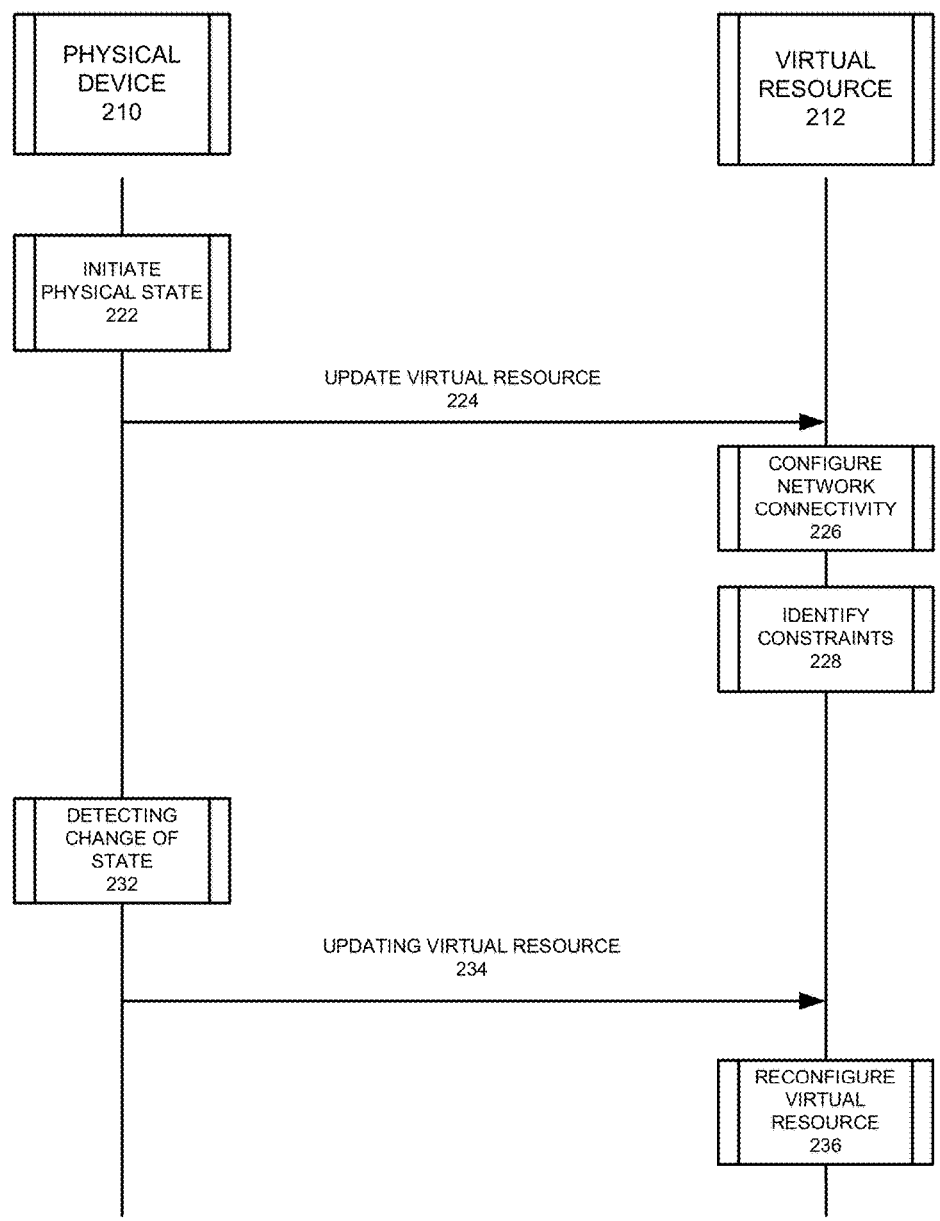
FIG. 2 illustrates a system communication diagram of a data communication session between a physical device and a virtual resource according to an example embodiment.

FIG. 2 illustrates a system communication diagram 200 of a data communication session between a physical device and a virtual resource according to an example embodiment. Referring to FIG. 2, a physical device 210, which includes a processor and memory, may initiate a physical status 222, such as a power-on, power-off, network connected, network disconnected, ping message sent/received, etc. The initial status may invoke a message be sent to update 224 a virtual resource application 212. The virtual resource may then be configured for network connectivity 226 or dis-connectivity depending on the purpose of the virtual resource configuration. Constraints may also be identified 228 to ensure the compliance is maintained with administrative goals and settings (i.e., location, time, access limitations, etc.). The subsequent changes 232 to the physical status of the physical device (i.e. reverse avatar enabled, power-on, mode change, etc.) may trigger an update to the virtual resource 234 so a reconfiguration may be performed accordingly 236.

Figure 3:
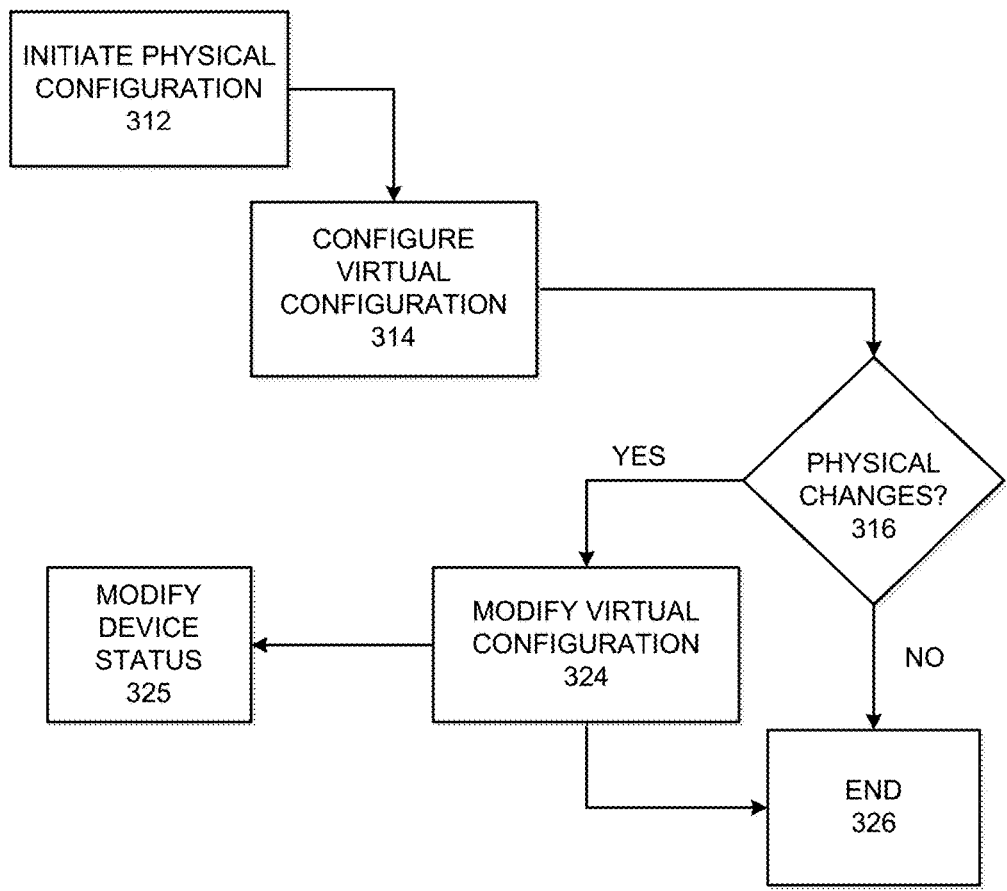
FIG. 3 illustrates a logic flow diagram of a resource management configuration according to an example embodiment.

FIG. 3 illustrates a logic diagram 300 of a resource management configuration according to an example embodiment. Referring to FIG. 3, the logic diagram 300 includes a series of operations, such as an initial physical configuration 312 which causes a virtual configuration 314 to be performed. The physical configuration 312 may be used as a basis to make changes to a virtual configuration 314. Thereafter, any changes 316 may cause more modifications to the virtual resources 324 and a corresponding status of the physical device 325 to be modified accordingly. Otherwise, the virtual resource may be maintained accordingly 325.

Figure 4:
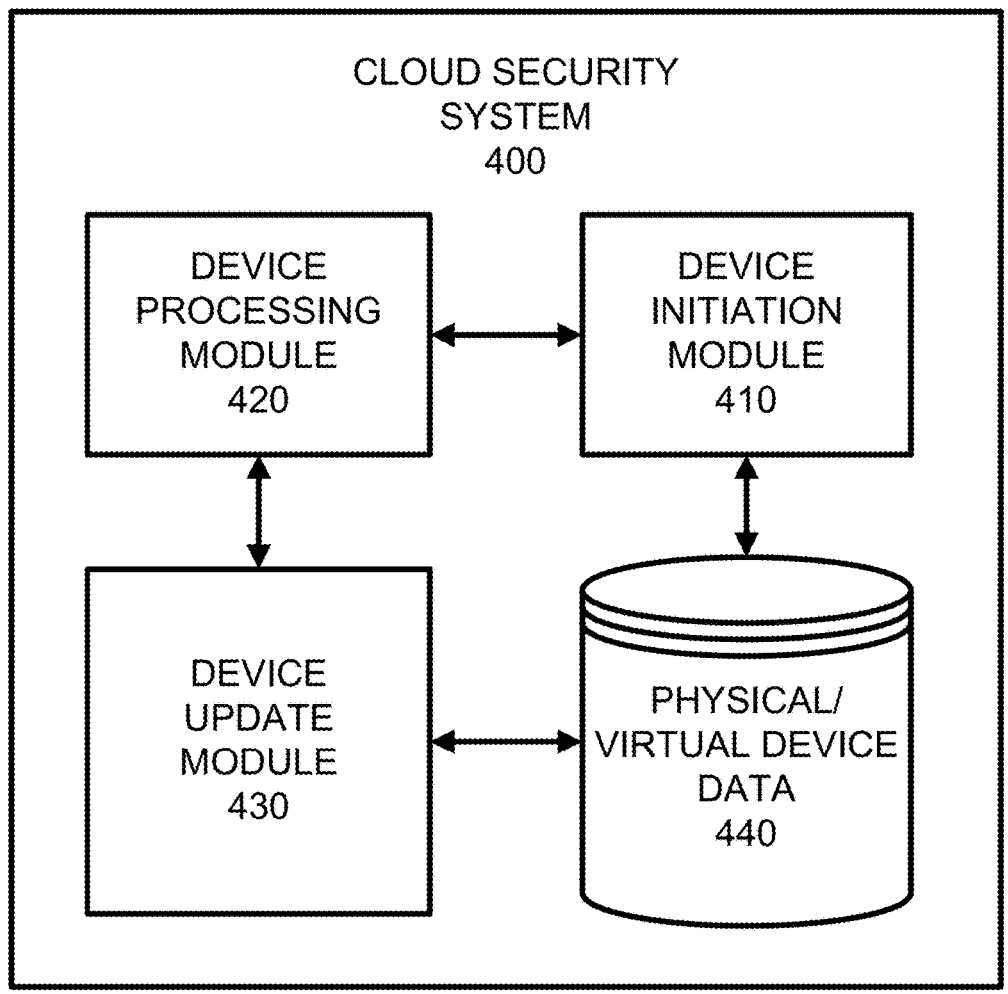
FIG. 4 illustrates a system configuration configured to perform one or more of the example embodiments of the present application.

FIG. 4 illustrates a system configuration 400 configured to perform one or more of the example embodiments. Referring to FIG. 4, a cloud security system 400 may be a single server, device or multiple devices which support the operation of the security measures of the virtual environment. The system 400 includes an initiation module 410 which receives physical device updates, such as a status update. A processing module 420 may receive the updated status and prepare updates to the virtual resources depending on the status of the physical device being monitored. An update module 430 may ensure the updates are processed accordingly based on the physical device and virtual resource data stored in the databank 440.

Referring to FIG. 4, the system 400 may perform one example method of operation, which may include associating a virtual resource with a physical device. The device initiation module 410 may identify a particular physical device operating on the network, such as a workstation, smartphone, printer, router, handheld computing device, or any device with a processor and memory capable of communication with other network devices. That device may be managed and identified via a virtual application. The system 400 may also include configuring the virtual resource based on an initial state of the physical device via the processing module 420. The initial state may be an on or off state and the virtual resource may be a replicated image or identity of the device and its resources within the virtual application. The system 400 may then detect a change in the initial state of the physical device to a different state of the physical device, such as on then off or operating vs. suspended operation. The device update module 430 may then perform updating the virtual resource based on the different state of the physical device and updating the databank 440 in the cloud. The update may include that the device is not disable/enabled, or certain resources which are available/unavailable are now available/unavailable.

The virtual resource is a resource identified form the virtual management application managed by a remote management device, such as a user's workstation, smartphone or any device with a processor and memory. The virtual resource may be configured based on at least one of a time constraint and a location constraint. The constraints may be applied by the virtual management application of the management device and may apply to that particular management device as those constraints were imposed by a third party or administrator and were granted to the management device subject to the constraints. The physical device could be a computing device, a router, a smartphone and a touch sensitive sensor device or any device with a memory and processor.

In operation, the initial state of the physical device could include at least one of a power-off state, a power-on state, a suspended operation state, and an active operation state. The suspended operation state may indicate that the device is operational however no applications or functions are currently implemented until further notice. The different state of the physical device may include any of the power-off state, the power-on state, the suspended operation state and the active operation state provided that it is different from the initial state. The method of operation may continue with connecting or disconnecting a peripheral device to the remote management device which is configured to control the physical device. The peripheral device may be the "reverse avatar" and may serve to trigger a change in the state of the physical device being managed. Responsive to connecting or disconnecting the peripheral device, a virtual management application may be triggered to enable connectivity or disable connectivity with the physical device. This may provide a way to enable or disable the physical device simply by attaching a peripheral device serving as a reverse avatar to the management device.

In another example, when the management device receives access to virtual resources and a particular physical device, an operation may perform enabling at least one of the time constraint and the location constraint to begin monitoring at least one of a predetermined time duration and movement activity of a remote management device configured to manage the physical device, and updating the virtual resource to remove communication with the remote management device based on at least one of the predetermined time duration being exceeded and the movement activity of the remote management device exceeding a threshold distance. This provides that the management device is capable of utilizing virtual resources and/or the physical device, however, if the management device exceeds a certain distance threshold or a certain period of time has lapsed, those rights could be withdrawn and the virtual management application may update to remove the management device from the list of accessible devices to the virtual resources.

The operations of one or more steps described or depicted in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent any of the above-described network components, etc.

Figure 5:
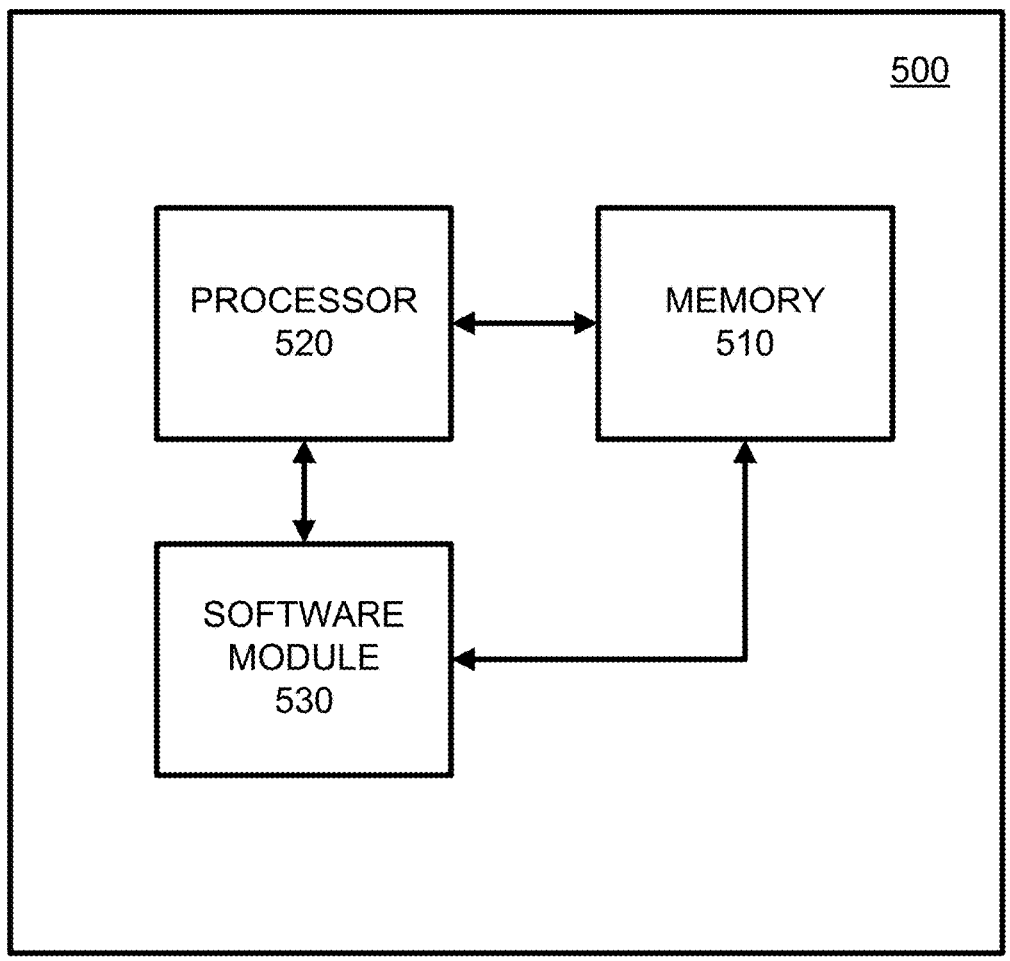
FIG. 5 illustrates an example network entity device configured to store instructions to perform one or more of the example embodiments.

As illustrated in FIG. 5, a network entity 500 includes a memory 510 and a processor 520 used to execute an application or set of operations. The application may be coded in software in a computer language understood by the processor 520, and stored in a non-transitory computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Figure 6:
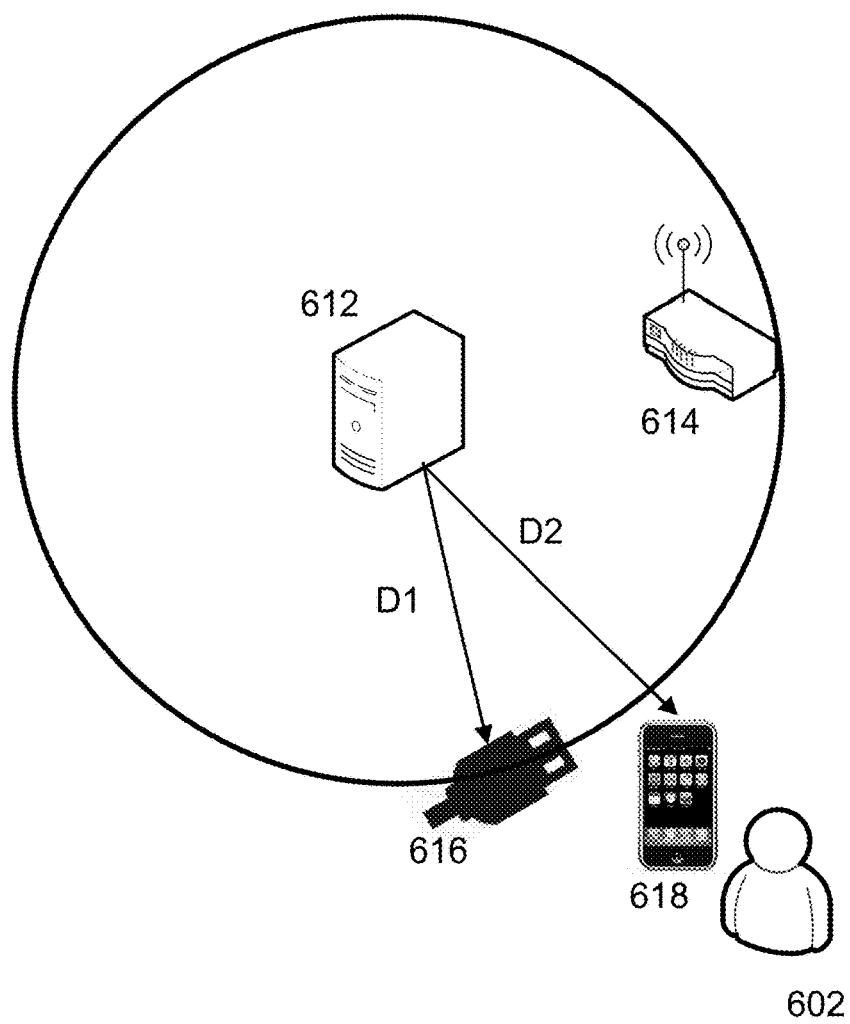
FIG. 6 illustrates an alternate embodiment with a reverse avatar being identified based on a location perimeter.

FIG. 6 illustrates an alternate embodiment with a reverse avatar being identified based on a location perimeter. Referring to FIG. 6, the computer workstation 612 may represent a home computer, an enterprise computer or any computing device capable of identifying a reverse avatar device and/or condition for enacting a change in the active status of a managed device 618 (e.g., a mobile device). In this example, a radius distance 'D1' is used to identify a distance of the reverse avatar and/or the distance 'D2' of the managed device 618 as a basis for enacting security on the network elements 612 and 614 (e.g., a workstation and router). Such an approach may include the wireless network range of the router 614 and/or other measures for distance radius management to ensure that the correct users are managing the workstation status.

In operation, the user 602 may be approaching a wireless network range distance (represented by the circle). The reverse avatar 616 may include a USB interface device that is plugged into the device 618 or removed from the device

618. The condition may require the device 616 to be plugged into the device 618 in order for a change in status to occur at the workstation 612 (i.e. power on, power off, standby condition, limited accessibility, full accessibility, etc.). The device 618 may be configured to communicate with the router 614 once it is in communication range, however, once the device moves into or out of communication range, any of the above-noted conditions or statuses may be enacted. In this case, the reverse avatar 616 is the communication status of the device 618 with the router 614 which is also in communication with the workstation 612. As the user 602 is departing the wireless network range distance 612 opposite actions may occur related to those described herein.

Figure 7:
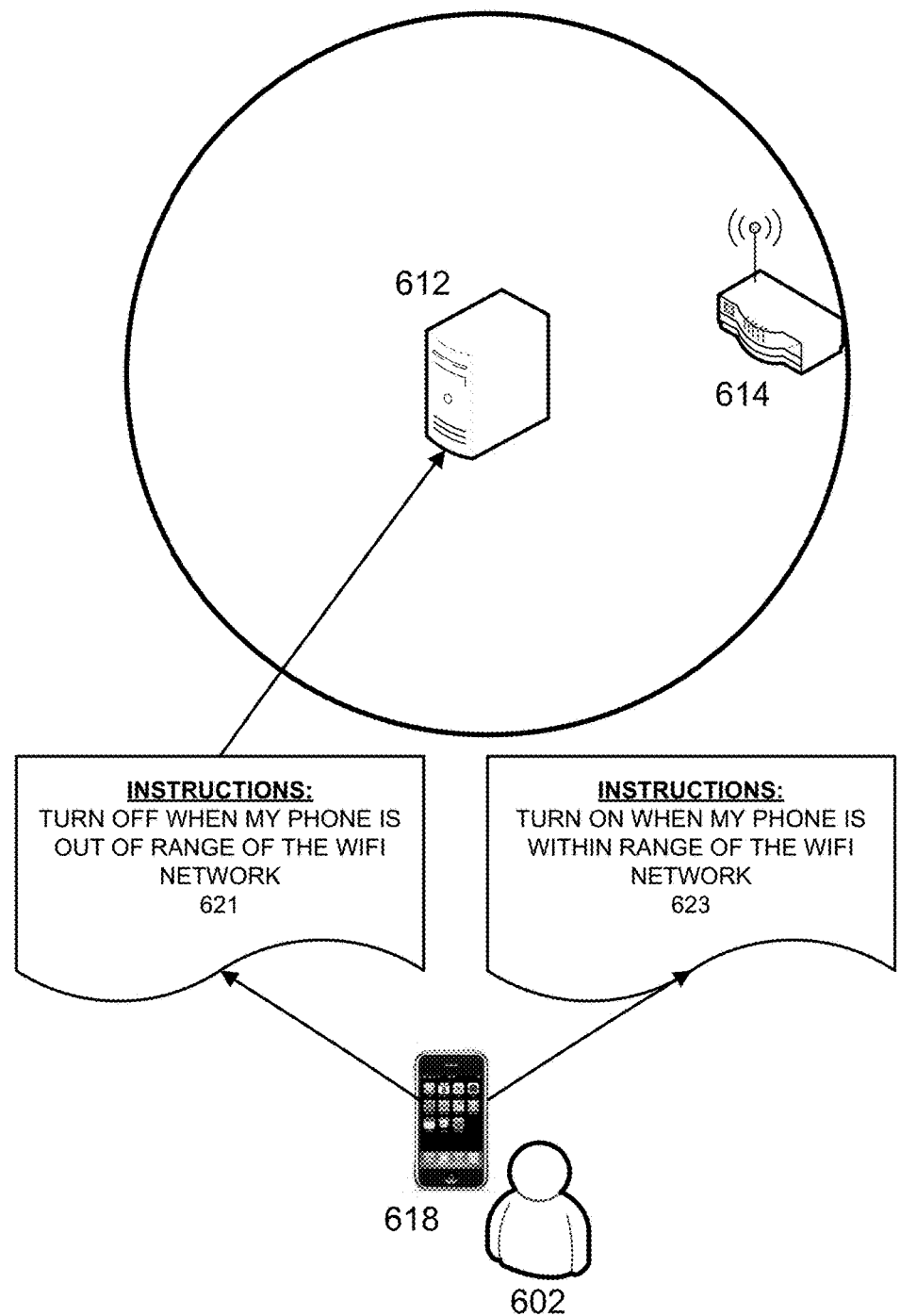
FIG. 7 illustrates an alternate embodiment with a reverse avatar being identified based on a predetermined location instruction associated with a mobile device.

FIG. 7 illustrates an alternate embodiment with a reverse avatar being identified based on a predetermined location instruction associated with a device 618, such as a mobile device. Referring to FIG. 7, a message specific action point or "transparent avatar" in this instance is a range communication status. For example, when the mobile device 618 is out of range of the router 614, then instruction(s) 621 may be enacted to turn off the workstation 612. Also, instruction (s) 632 may be enacted to turn on the workstation 612 when the device 618 is in range of and identified by the router 614. In other embodiments, the workstation 612, which may be any device containing a processor and memory, may be a device with wireless capability (such as a laptop, tablet, phone, watch, etc.) and the router 614 would not be needed to enact one or more of the features disclosed herein.

The condition can be established by any known method of transferring data and setting up an instruction, such as via a message by any known communication platform. In this situation, a message is received and security is performed by a reverse avatar management application located in one or more of the devices described herein. Associated actions are not based on the workstation 612 receiving the message but instead the management application receiving the "transparent avatar" instruction. This instruction is based on using a communication range as the basis for security enactment and the actions performed by the application accordingly.

Figure 8:
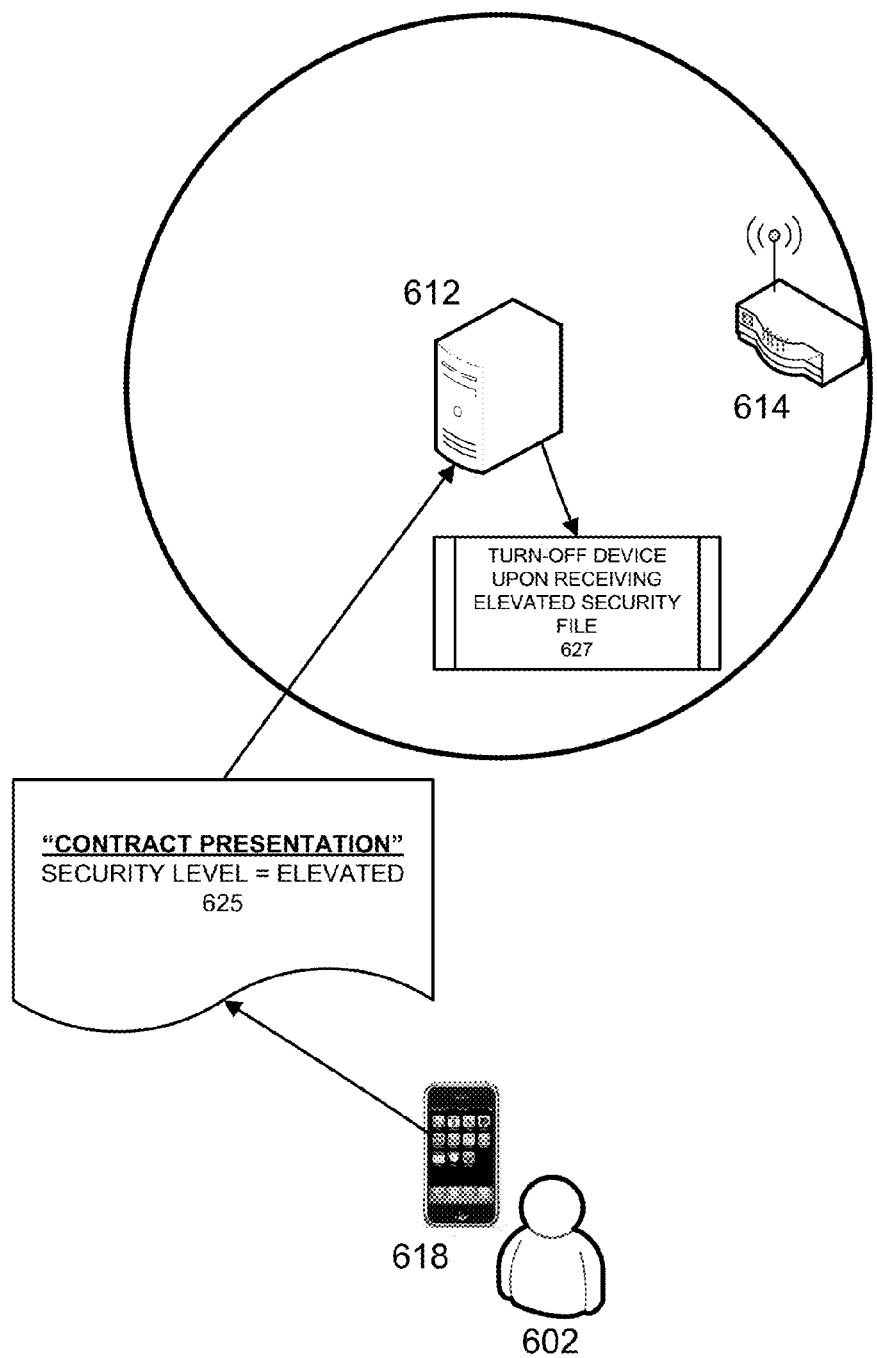
FIG. 8 illustrates an alternate embodiment with a reverse avatar being identified based on a predetermined security instruction associated with a document.

FIG. 8 illustrates an alternate embodiment with a reverse avatar being identified based on a predetermined security instruction associated with any data such as a document, photo, video, etc. Referring to FIG. 8, a certain action is identified, such as accessing an elevated security file on a machine or receiving a secure file with an elevated level of security. In this example, one result would be a lock-down or security enactment measure based on the 'transparent avatar' action of sending or saving a file with secure attributes. The security rating enabled an action on the virtual network to change the status of the physical device. For example, a document 625 may be a secure enterprise document that was sent via email to a device 618, which may be any device including a processor and memory, utilized by a user 602. The document 625 may have a secure rating or contain sensitive information recognized by one or more devices disclosed herein as a security threat to outside viewers.

In this example, the document 625 is a "contract presentation" for an important business division. As a result, the workstation 612 may synchronize with an email application and be able to identify the sensitive information in the email and turn itself off once the document is sent and/or received. Additionally, the device 618 may receive the document 625 and the application may then notify the workstation 612 to turn-off since both devices are affiliated with a common user account and both are subject to the security settings of the reverse avatar security application.

Although an exemplary embodiment of the system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual components or modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
designating an operating state of an input/output (JO) port of a physical device for virtually controlling an operating state of a virtual network connection component of a remote device, wherein the physical device and the remote device are connected via a network;
configuring the operating state of the virtual network connection component of the remote device based on an initially detected operating state of the IO port of the physical device;
detecting an attachment or a detachment of a cable to the designated I/O port of the physical device; and
transmitting a control signal to the remote device which triggers a change in the operating state of the virtual network connection component of the remote device based on the detected attachment or detachment of the cable to the designated I/O port of the physical device.

2. The method of claim 1, wherein the virtual control of the operating state of the virtual network connection component of the remote device by the physical device is restricted based on at least one of a time constraint and a location constraint of the physical device.

3. The method of claim 1, wherein the physical device comprises at least one of a computing device, a router, a smartphone, a touch sensitive sensor device, and a device including a processor and memory.

4. The method of claim 1, wherein the initially detected operating state of the designated I/O port of the physical device comprises at least one of a power-off state, a power-on state, a suspended operation state, and an active operation state.

5. The method of claim 1, wherein the change in the operating state of the designated I/O port of the physical device comprises at least one of a power-off state, a power-on state, a suspended operation state, and an active operation state.

6. The method of claim 1, wherein the detected change is created by a user action externally connecting or disconnecting the cable to at least one of a universal serial bus (USB) port and a network card of the physical device; and
responsive to connecting or disconnecting the cable, transmitting a control signal that triggers connectivity or disables connectivity of a virtual network interface card of the remote device.

7. The method of claim 2, further comprising:
monitoring at least one of a predetermined time duration and movement activity of the physical device; and
removing communication between the physical device and the remote device based on at least one of the predetermined time duration being exceeded and the movement activity exceeding a threshold distance.

8. An apparatus, comprising:
a processor configured to:
designate an operating state of an input/output (I/O) port of a physical device for virtually controlling an operating state of a virtual network connection component of a remote device, wherein the physical device and the remote device are connected via a network;
configure the operating state of the virtual network connection component of the remote device based on an initially detected operating state of the I/O port of the physical device;
detect an attachment or a detachment of a cable to the designated I/O port of the physical device; and
a transmitter configured to transmit a control signal to the remote device which triggers a change in the operating state of the virtual network connection component of the remote device based on the detected attachment or detachment of the cable to the designated I/O port of the physical device.

9. The apparatus of claim 8, wherein the virtual control of the operating state of the virtual network connection component of the remote device by the physical device is restricted based on at least one of a time constraint and a location constraint of the physical device.

10. The apparatus of claim 8, wherein the physical device comprises at least one of a computing device, a router, a smartphone, a touch sensitive sensor device, and a device including a processor and memory.

11. The apparatus of claim 8, wherein the initially detected operating state of the designated I/O port of the physical device comprises at least one of a power-off state, a power-on state, a suspended operation state, and an active operation state.

12. The apparatus of claim 8, wherein the detected change in the operating state of the designated I/O port of the physical device comprises at least one of a power-off state, a power-on state, a suspended operation state and an active operation state.

13. The apparatus of claim 8, further comprising an interface configured to detect an external user action which connects or disconnects the cable to at least one of a universal serial bus (USB) port and a network card of the physical device, wherein responsive to the connecting or disconnecting of the cable, the transmitter is configured to transmit a control signal that enables connectivity or disables connectivity of a corresponding virtual network interface card of the remote device.

14. The apparatus of claim 9, wherein the processor is further configured to perform at least one of:
monitor for at least one of a predetermined time duration and movement activity of the physical device; and
remove communication between the physical device and the remote device based on at least one of the predetermined time duration being exceeded and the movement activity exceeding a threshold distance.

15. A non-transitory computer readable storage medium configured to store instructions that when executed cause a processor to perform:
designating an operating state of an input/output (JO) port of a physical device for virtually controlling an operating state of a virtual network connection component of a remote device, wherein the physical device and the remote device are connected via a network;
configuring the operating state of the virtual network connection component of the remote device based on an initially detected operating state of the IO port of the physical device;
detecting an attachment or a detachment of a cable to the designated I/O port of the physical device; and
transmitting a control signal to the remote device which triggers a change in the operating state of the virtual network connection component of the remote device based on the detected attachment or detachment of the cable to the designated I/O port of the physical device.

16. The non-transitory computer readable storage medium of claim 15, wherein the virtual control of the operating state of the virtual network connection component of the remote device by the physical device is restricted based on at least one of a time constraint and a location constraint of the physical device.

17. The non-transitory computer readable storage medium of claim 15, wherein the physical device comprises at least one of a computing device, a router, a smartphone, a touch sensitive sensor device, and a device including a processor and memory.

18. The non-transitory computer readable storage medium of claim 15, wherein the initially detected operating state of the designated I/O port of the physical device comprises at least one of a power-off state, a power-on state, a suspended operation state, and an active operation state.

19. The non-transitory computer readable storage medium of claim 15, wherein the detected change in the operating state of designated I/O port of the physical device comprises at least one of a power-off state, a power-on state, a suspended operation state and an active operation state.

20. The non-transitory computer readable storage medium of claim 16, wherein the processor is further configured to perform at least one of:
monitoring at least one of a predetermined time duration and movement activity of the physical device; and
removing communication between the physical device and the remote device based on at least one of the predetermined time duration being exceeded and the movement activity exceeding a threshold distance.

21. The method of claim 1, wherein the configuring of the operating state of the virtual network connection component of the remote device and the transmitting the control signal to the remote device which triggers the change to the operating state of the virtual network connection component of the remote device are performed by a virtual management application executing on the physical device.

22. The method of claim 1, wherein the transmitted control signal triggers an internal change in a power on/off state of the virtual network connection component of the remote device to match the detected change in a power on/off state of the designated I/O port of the physical device as a result of the cable being attached or detached.

23. The method of claim 1, wherein the physical device comprises a mobile device and the remote device comprises one or more of a virtual switch, a virtual machine, and a virtual server.

* * * * *